April 8, 1941. R. J. RUTHS 2,237,316
BEARING STRUCTURE
Filed June 3, 1940 2 Sheets-Sheet 2
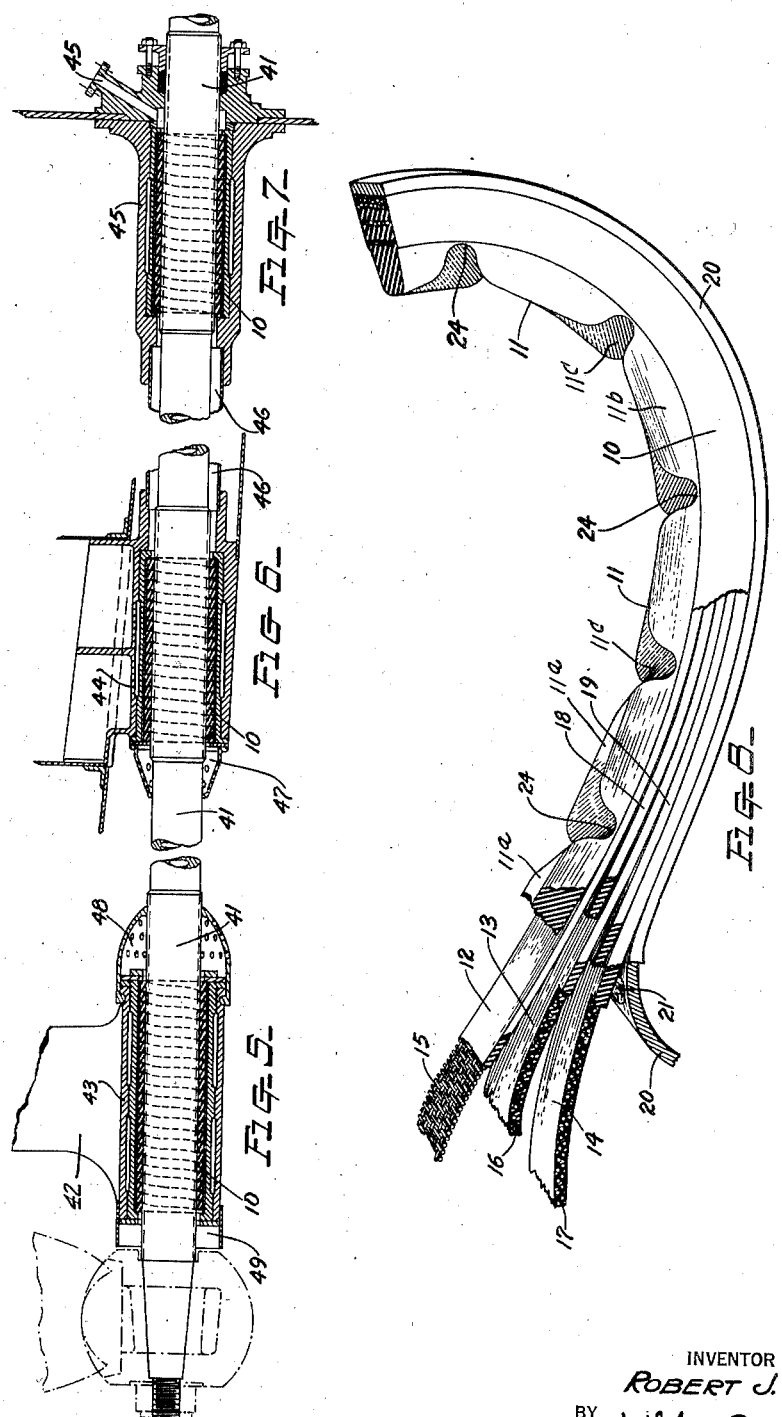
INVENTOR
ROBERT J. RUTHS
BY
ATTORNEY Patented Apr. 8, 1941

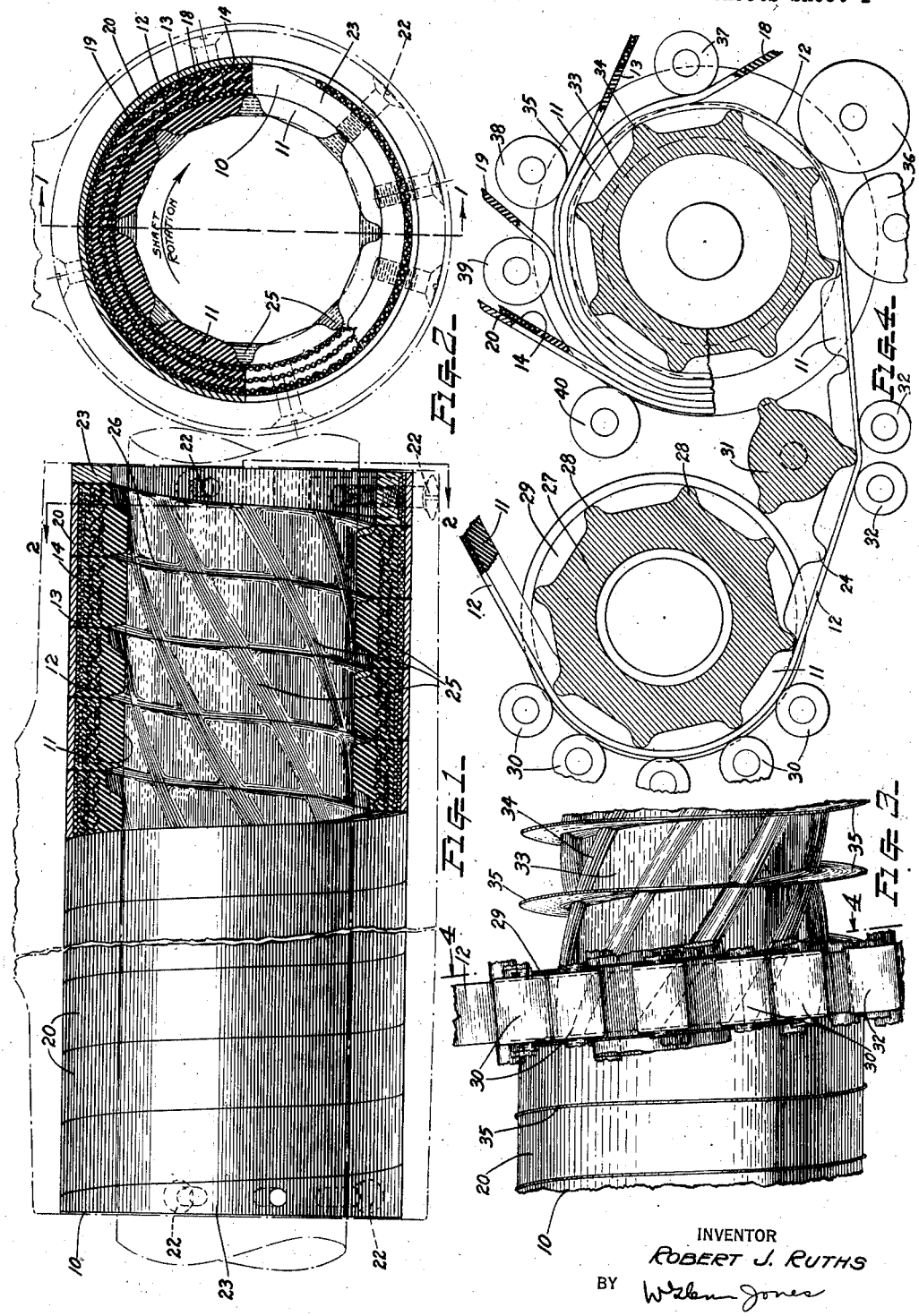

2,237,316

UNITED STATES PATENT OFFICE 2,237,316

BEARING STRUCTURE

Robert J. Ruths, Baltimore, Md.

Application June 3, 1940, Serial No. 338,547

17 Claims. (Cl. 308—238)

(Granted under the act of March 3, 1883, as amended April 30, 1928; 370 O. G. 757)

The present invention relates to a bearing structure, and it has a particular relation to bearings subjected to the action of water such as the shafting of marine propellers and the like.

The principal object of the invention is the provision of a bearing of the character described, which comprises in its essentials a helically wound composite band having an outer metallic strap and an inner shaft engaging portion of anti-friction rubberlike compound vulcanized thereto and insertable as a unit in desired lengths within the bearing housing, the construction being such that any tendency for the bearing compound from being separated from its metallic support, due to the rotation of the shaft, is materially reduced, if not eliminated.

Another object of the invention is the provision of a bearing of the character specified in which the weight of the shaft is uniformly distributed circumferentially thereof, and in which a self-circulation of lubricating film of uniform thickness is insured entirely around the bearing and throughout its length.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claims. In the accompanying drawings:

Fig. 1 is a view, partly in side elevation and partly in longitudinal section, of a bearing constructed in accordance with the invention, the sectional portion of the bearing being taken on line 1—1 of Fig. 2;

Fig. 2 is an end view of the bearing shown in Fig. 1, partly in elevation and partly in transverse section, taken on line 2—2 of Fig. 1;

Fig. 3 is a side elevational view of the tread forming and vulcanizing core showing the bearing strip or band being wound helically thereon;

Fig. 4 is a transverse sectional view taken on line 4—4 of Fig. 3, and illustrating the manner of and sequence that the several layers of the composite bearing strip are wound onto the vulcanizing mandrel or core;

Figs. 5, 6 and 7 are vertical longitudinal sectional views through the forward, after and propeller bearing housing respectively, showing the location of the improved bearings; and Fig. 8 is a perspective view of a portion of the bearing strip showing its laminated construction.

Referring to the drawings, a bearing embodying the invention is shown as comprising a helically wound band 10 of composite laminated structure, being composed of an inner flexible anti-friction tread portion 11 of rubber or the like; superimposed breaker strips 12, 13 and 14, having brass or bronze wire mesh, 15, 16 and 17, molded therein for reinforcing purposes; interposed strips 18 and 19 of a suitable vulcanizible compound such as rubber, Duprene or the like, and an outer band 20 of brass or bronze, the whole being vulcanized together in a manner presently to be described, to form a unitary flexible structure. In addition, the band 20 is preferably anchored by spot welding to the reinforcing mesh of the breaker strip 14, as indicated at 21 in Fig. 8.

The ends of the helically wound band 10 of the completed bearing are cut perpendicularly to the longitudinal axis of the bearing and the ends of the metallic outer strip 20 are secured by screws 22 to collars 23, which are shaped to conform with the tapered or beveled end of the band. The inner tread portion 11 of the band forming the bearing is preformed with a plurality of grooves or indentations 24, Fig. 8, which cooperate and register with one another in the assembled bearing, Fig. 1, to provide a plurality of spaced helical channels 25 of relatively steep pitch extending longitudinally of the bearing. Also, the opposite inner edges of the tread portion 11 is beveled to form a helical channel 26 of relatively gradual pitch. These channels cooperate to conduct lubricating fluid, whether water, if the bearing is located outboard of the vessel, or vegetable oil if the bearing is located inboard thereof, longitudinally of the bearing. The rotation of the shaft carries lubricant from the channels and distributes it in a uniform film over the tread portions 11 with a squeegee action. In the event that sand or other foreign matter gains access to the bearing, it will collect in the channels 26 and gradually be worked out by the circulating lubricant without being carried over the treads 11 and scarring the same, or becoming embedded therein, as in the case of straight longitudinal parallel channels heretofore employed. Another advantage of the spiral channels is that the several tread portions 11 are stepped or offset relative to one another longitudinally of the bearing, thus insuring a continuous support for the shaft, both longitudinally and circumferentially thereof.

The helical construction of the bearing permits the same to be warped slightly, either radially, outwardly or inwardly, so as to accommodate shafts of different diameters, provided that the band is not flexed to a degree where the indentations 24 are shifted out of alignment with one another so as to interfere with the flow of lubricant through the spiral channels 25 defined thereby.

The band 10 may be fabricated, as shown in Figs. 3 and 4, wherein the unvulcanized tread 11 which has been previously pressed into impregnating engagement with the wire mesh reinforced breaker strip 12 is carried around a rotating die 27, Fig. 4, provided with axially inclined ribs or ridges 28 arranged in spaced relation about the circumference thereof and annular side flanges 29. As the band passes around the die 27 a plurality of pressure rolls 30 forces the soft tread material into the spaces between the ridges 28, forming the spaced tread portions 11 and transversely inclined indentations 24.

After leaving the die 27 the band thus formed passes between an idler roll 31 and retaining rollers 32 and onto an elongated hollow core or mandrel 33 through which live steam may at the proper time, be circulated. This mandrel is formed with a plurality of spiral ridges 34 extending its entire length and spaced apart the same distance as the indentations 24, so as to register therewith and also with a helical retaining wall 35 forming a channel for receiving the band being fabricated and wound on the mandrel. The tread portion 11 and breaker strip 12 are held against the mandrel 33 by pressure rolls 36 and the breaker strips 13 and 14, interposed vulcanizable strips 18 and 19, and outer metallic band 20 are fed onto the mandrel successively at spaced points circumferentially thereof and forced into engagement with one another by pressure rolls 37, 38, 39 and 40.

As soon as the composite band 10 is completely wound onto the mandrel 33 and pressed into the helical channel thereon, its ends are beveled, as previously described, and held in position by temporary clamping means, not shown. Live steam is then admitted into the mandrel and the several strips vulcanized and bonded together to form a unitary structure. The finished band is then stripped from the mandrel in the form of an elastic helix.

In Figs. 5, 6 and 7, a propeller shaft 41 is shown as extending through a strut or after bearing housing 42, and after and forward stern tube bearing housings 43 and 44 respectively. Water or other lubricant is freely circulated through the channels 25 and 26 in the bearings from an inlet pipe 45 and water tube 46, Fig. 7, tube 46 and perforated conical after fairwater 47, Fig. 6, and forward perforated fairwater 48 and after fairwater 49, Fig. 5. The helical bearings, hereinbefore described, are inserted in the housings after the shaft 41 has been mounted therein by winding the bearing band 10 around the shaft and by tapping the separate convolutions thereof into the housings until the convolutions all contact with one another, as shown in Fig. 1. The collars 23 may be secured to the ends of the band 10 just before the last convolution is tapped into position. The band 10 may be easily removed for replacement by removing the collars 23 and withdrawing the band 10 from the housing by unwinding it from the shaft.

The spaced tread portions are each formed to provide a substantially flat diamond shaped tread or top surface 11a with the corner of a tread of one convolution being disposed adjacent to a corner of a tread of the adjacent convolution. By reason of the helical configuration of the channels 25 and 26, said adjacent treads will be offset slightly relative to one another. It will be understood, however, that the flat sides of the convolutions of the band formed by the parts 12, 13, 14, 15, 16, 17 and 20, and which constitutes the supporting base, are in contact with one another, see Fig. 1.

The sides 11b and 11c of said tread portions, diverging away from said shaft contact surface 11a to merge into the longitudinal sides of the band 10, which are formed flat and parallel. In other words, viewing Fig. 8, the sides 11b and 11c of each tread portion converge toward the contact surface of the tread. Thus, when the band 10 is helically wound within a bearing housing, the flat sides thereof will abut each other so that the converging sides 11b of the tread portions 11 opposed to each other will define the lubricating channel 26.

In a like manner the converging sides 11c of the tread portions will define the channels 25 in the helically wound band 10. Preferably, the edges and corners of the tread portions are rounded.

It will be understood that the above description and accompanying drawings comprehend only the general and preferred embodiment of the invention, and that various changes in construction, proportion and arrangement of the parts may be made by those skilled in the art within the scope of the appended claims without sacrificing any of the advantages of the invention.

The invention described herein may be manufactured and/or used by or for the Government of the United States of America for governmental purposes without the payment of any royalties thereon or therefor.

What is claimed is:

1. A bushing adapted to be inserted in a shaft housing and comprising a helical band having an internal shaft engaging tread portion of elastic, anti-friction material, an intermediate reinforcing breaker strip and an outer metallic band, all vulcanized together to form a unitary structure.

2. A bushing adapted to be inserted in a shaft housing and comprising a helical band having an internal shaft engaging tread portion of elastic, anti-friction material, an intermediate reinforcing breaker strip and an outer metallic band, all vulcanized together to form a unitary structure, the convolutions of said band being separable when the bushing is being assembled and disassembled, but in contact with one another when positioned in said housing.

3. A bushing adapted to be inserted in a shaft housing and comprising a helical band having an internal shaft engaging tread portion of elastic, anti-friction material, an intermediate reinforcing breaker strip and an outer metallic band, all vulcanized to form a unitary structure, said outer metallic band being welded to said breaker strip.

4. A bushing adapted to be inserted in a shaft housing and comprising a helical band having an internal shaft engaging tread portion of elastic, anti-friction material, an intermediate reinforcing breaker strip, an outer metallic band, all vulcanized together to form a unitary structure, and a metallic collar secured to said helical band at each end thereof.

5. A bearing comprising a unitary helical strip having a plurality of spaced resilient tread portions formed along one side with the longitudinal side walls of each tread portion converging away from the base thereof, said strip being disposed within a supporting housing with each convolution in abutting engagement with the other and with the surfaces of the tread portions defining an axial bore adapted to receive a shaft in bearing engagement therewith, said tread portions defining an uninterrupted helical channel extending the full length of the bearing, and the spaces between each tread portion communicating with adjacent convolutions of said helical channel, thereby to provide a positive flow of a lubricating medium across the entire bearing surface from one end of the bearing to the other.

6. A bearing structure comprising a flexible helical band adapted to be entwined around a shaft and having a flexible metallic base and a shaft engaging body portion of elastic antifriction bearing material bonded thereto, said metallic base constituting an outer cylindrical casing enclosing said bearing material when the convolutions of said helical band are disposed contiguous with one another.

7. A bearing structure comprising a flexible helical band adapted to be entwined around a shaft and having a flexible metallic base and a shaft engaging body portion of elastic antifriction bearing material bonded thereto and an intermediate breaker strip embedded in said body portion, said metallic base constituting an outer cylindrical casing enclosing said bearing material when the convolutions of said helical band are disposed contiguous with one another.

8. A bearing structure comprising a flexible helical band adapted to be entwined around a shaft and having a flexible metallic base and a shaft engaging body portion of elastic antifriction bearing material bonded thereto and an intermediate breaker strip of wire mesh embedded in said body portion, said metallic base constituting an outer cylindrical casing enclosing said bearing material when the convolutions of said helical band are disposed contiguous with one another.

9. A bearing structure comprising a flexible helical band adapted to be entwined around a shaft and having a flexible metallic base and a shaft engaging body portion of antifriction bearing material bonded thereto and an intermediate breaker strip of wire mesh embedded in said body portion and welded to said metallic base, said metallic base constituting an outer cylindrical casing enclosing said bearing material when the convolutions of said helical band are disposed contiguous with one another.

10. A bearing structure comprising a flexible helical band adapted to be entwined around a shaft and having a flexible metallic base and a shaft engaging body portion of elastic antifriction bearing material bonded thereto and a plurality of intermediate breaker strips of wire mesh embedded in said body portion, one of said breaker strips being welded to said metallic base and another thereof being free therefrom, said metallic base constituting an outer cylindrical casing enclosing said bearing material when the convolutions of said helical band are disposed contiguous with one another.

11. A bearing structure comprising a flexible helical band adapted to be entwined around a shaft and having a flexible metallic base and a shaft engaging body portion of elastic antifriction bearing material bonded thereto, said bearing material being formed with a plurality of transversely extending spaced grooves defining a plurality of shaft engaging tread portions, the grooves in one of the convolutions of said helical band communicating with the grooves in an adjacent convolution to define a plurality of channels extending throughout the length of the bearing for the circulation of a lubricant and said metallic base constituting an outer cylindrical casing enclosing said bearing material when the convolutions of said helical band are disposed contiguous with one another.

12. A bearing structure comprising a flexible helical band adapted to be entwined around a shaft and having a flexible metallic base and a shaft engaging body portion of elastic antifriction bearing material bonded thereto, said bearing material being formed with a plurality of diagonally extending spaced grooves defining a plurality of shaft engaging tread portions, the grooves in one of the convolutions of said helical band communicating with the grooves in an adjacent convolution to define a plurality of helical channels extending throughout the length of the bearing for the circulation of a lubricant and said metallic base constituting an outer cylindrical casing enclosing said bearing material when the convolutions of said helical band are disposed contiguous with one another.

13. A bearing structure comprising a flexible helical band adapted to be entwined around a shaft and having a flexible metallic base and a shaft engaging body portion of elastic antifriction bearing material bonded thereto, said body portion being formed with beveled edges defining a helical channel extending the entire length of the bearing for the circulation of a lubricant and said metallic base constituting an outer cylindrical casing enclosing said bearing material when the convolutions of said helical band are disposed contiguous with one another.

14. A bearing structure comprising a flexible helical band adapted to be entwined around a shaft and having a flexible metallic base and a shaft engaging body portion of elastic antifriction bearing material bonded thereto, said body portion being formed with a plurality of diagonally extending spaced grooves defining a plurality of shaft engaging tread portions, the grooves in one of the convolutions of said helical band communicating with the grooves in an adjacent convolution to form a plurality of helical channels extending the entire length of the bearing for the circulation of a lubricant, said body portion being also formed with beveled edges defining a single helical channel of different pitch intersecting said first mentioned channels, and said metallic base constituting an outer cylindrical casing enclosing said body portion when the convolutions of said helical band are disposed contiguous with one another.

15. A bearing structure comprising a flexible helical band adapted to be entwined around a shaft and having a flexible metallic base and a shaft engaging body portion of elastic antifriction bearing material bonded thereto and an intermediate breaker strip embedded in said body portion, said bearing material being formed with a plurality of transversely extending spaced grooves defining a plurality of shaft engaging tread portions, the grooves in one of the convolutions of said helical band communicating with the grooves in an adjacent convolution to define a plurality of channels extending throughout the length of the bearing for the circulation of a lubricant and said metallic base constituting an outer cylindrical casing enclosing said bearing material when the convolutions of said helical band are disposed contiguous with one another.

16. A bearing structure comprising a flexible helical band adapted to be entwined around a shaft and having a flexible metallic base and a shaft engaging body portion of elastic antifriction bearing material bonded thereto and an intermediate breaker strip of wire mesh embedded in said body portion and welded to said metallic base, said bearing material being formed with a plurality of transversely extending spaced grooves defining a plurality of shaft engaging tread portions, the grooves in one of the convolutions of said helical band communicating with the grooves in an adjacent convolution to define a plurality of channels extending throughout the length of the bearing for the circulation of a lubricant and said metallic base constituting an outer cylindrical casing enclosing said bearing material when the convolutions of said helical band are disposed contiguous with one another.

17. A bearing structure comprising a flexible helical band adapted to be entwined around a shaft and having a flexible metallic base and a shaft engaging body portion of elastic antifriction bearing material bonded thereto and a plurality of intermediate breaker strips of wire mesh embedded in said body portion, one of said breaker strips being welded to said metallic base and another thereof being free therefrom, said bearing material being formed with a plurality of transversely extending spaced grooves defining a plurality of shaft engaging tread portions, the grooves in one of the convolutions of said helical band communicating with the grooves in an adjacent convolution to form a plurality of channels extending throughout the length of the bearing for the circulation of a lubricant and said metallic base constituting an outer cylindrical casing enclosing said bearing material when the convolutions of said helical band are disposed contiguous with one another.

ROBERT J. RUTHS.